M. PEARL.
VESSEL COVER LOCKING DEVICE.
APPLICATION FILED FEB. 17, 1913.
1,123,918.
Patented Jan. 5, 1915.
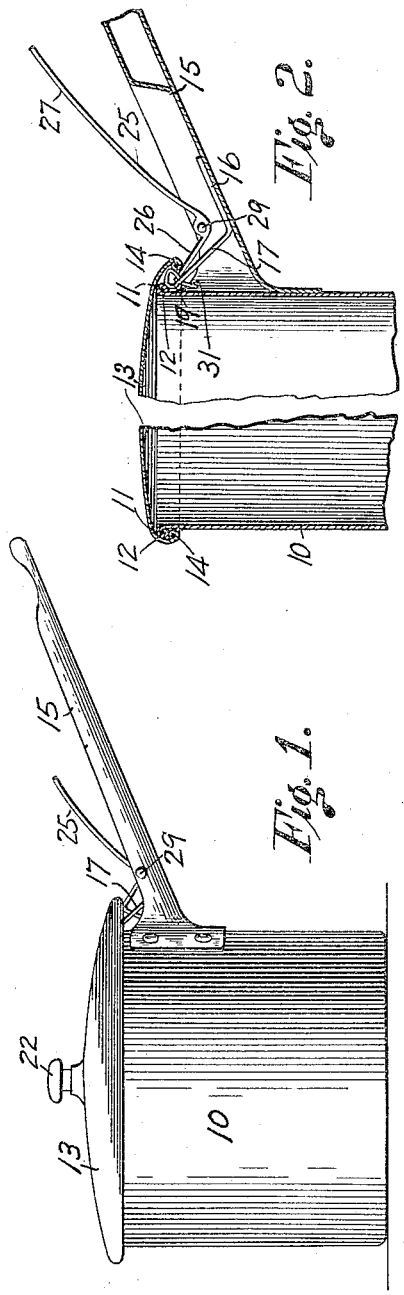
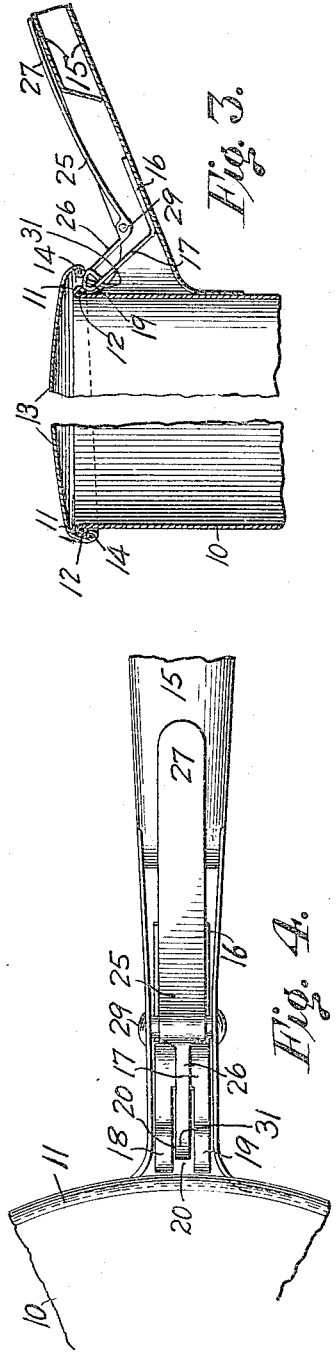

UNITED STATES PATENT OFFICE.

MAX PEARL, OF NEW YORK, N. Y.

VESSEL-COVER-LOCKING DEVICE.

1,123,918. Specification of Letters Patent. Patented Jan. 5, 1915.

Application filed February 17, 1913. Serial No. 748,987.

*To all whom it may concern:*

Be it known that I, MAX PEARL, a citizen of the United States, residing in New York, borough of Brooklyn, in the State of New York, have invented certain new and useful Improvements in Vessel-Cover-Locking Devices, of which the following is a specification.

The object of the present invention is to provide means for securing the cover of a vessel in place thereon against the ordinary shocks and strains of use, and to provide means for mechanically releasing the cover from the grasp of the securing devices, so that the cover may be readily removed from the vessel.

The invention comprises a locking-device for vessel-covers, consisting of a catch for engaging the cover and holding the same in place on the vessel, and a latch adapted to release the cover from the catch.

In the accompanying drawing, Figure 1 is a side-elevation of a vessel provided with a locking-device embodying the invention, Fig. 2 is a vertical section on a larger scale through the vessel and its handle, a part of the vessel being broken away, the locking-device being shown in side-view, with the cover held thereby in closed position, Fig. 3 is a similar section showing the cover released, and Fig. 4 is a top-view with the cover removed.

Similar reference numerals indicate corresponding parts in all the figures.

The body 10 of the vessel is provided at its upper edge with an exterior bead 11, formed by turning the metal of the vessel over upon a wire 12, or in any other suitable manner. The cover 13 is provided with an internal bead 14. To the handle 15 of the vessel is secured a catch comprising a base 16 soldered or otherwise fastened to the handle, a stem 17 extending upwardly from said base, and an outwardly-projecting nose at the upper end of said stem, said nose being arranged adjacent to and substantially on a level with the top of the vessel, and having an upper surface downwardly inclined outwardly from the rear portion to the point of the nose. The nose is divided vertically into two parts 18, 19, as shown in Fig. 4, with a space or slot 20 between them, which slot also extends downwardly into the stem 17. The cover is made of larger diameter than the top of the vessel. When the cover is applied to the vessel, the bead 14 of the cover engages the bead 11 of the vessel at the side of the same opposite the catch, retaining the cover on the vessel at that side thereof. At the other side of the vessel the bead 14 of the cover rests upon the catch. Upon now pressing down the cover by means of its handle 22 or otherwise, the bead 14 passes over the nose 18, 19, and is held in position below the same, as shown in Fig. 2. This action is permitted jointly by the spring-tension of the cover, the spring-tension of the vessel-body 10, and the spring-tension of the stem 17, whereby the nose is permitted to yield and permit the bead 14 to pass. The underside of the nose is upwardly inclined, and bears constantly downwardly on the rounded bead 14 when engaged therewith as shown in Fig. 2, thus retaining the cover locked in closed position.

For releasing the cover, a manually-operable latch 25 is provided, comprising a lifting-finger 26 upwardly inclined toward and extending at its forward end beneath the edge of the cover, and a latch-handle 27 extending from the other end of the lifting-finger. The finger and latch-handle are preferably formed of one piece of metal, which is pivoted by a horizontal pin 29 to the handle 15 of the vessel. From the forward end of the lifting-finger 26 a lip 31 extends downwardly in the slot 20 and is guided at its sides on the stem 17 at both sides of the slot, thus preventing undue lateral play of the lifting finger and causing the same to always reliably pass between the two portions 18, 19, of the nose, without being arrested by the same.

When the cover is being applied to the vessel in the manner before described, the bead 14 presses downwardly on the lifting-finger 26, and causes the same to descend from the position shown in Fig. 3 to that shown in Fig. 2, thus raising the latch-handle and leaving the lifting-finger engaged with the underside of the cover. For releasing the cover it is only necessary to depress the latch-handle 27, from the position shown in Fig. 2 to the position shown in Fig. 3, which may be conveniently done by the thumb of the hand. The lifting-finger by reason of its inclined position bears upwardly and at the same time outwardly on the cover, thus easily and readily disengaging the cover from the nose. The cover then rests by its bead 14 on the upper surface of the nose, and may be lifted by its handle 22 away from the vessel. The nose being located slightly below the plane of the upper edge of the vessel, the cover even when released and resting upon the nose, is engaged with the vessel to such extent as not to fall therefrom.

When the cover is in released position as shown in Fig. 3, the working end of the finger 26 is on substantially the same plane with the upper surface of the nose, and in this position it is arrested and supported by abutment of the outer end of the latch-handle 27 with the vessel-handle 15. Thus the finger on the one hand is prevented from being raised above the nose and thereby lifting the cover farther than necessary or desirable, and on the other hand is retained constantly in proper position for being engaged and actuated by the cover when the latter is depressed.

The locking-device provides a simple and reliable means of securing the covers of vessels, and of releasing the same. The degree of security afforded may be adjusted by giving the stem 17 a permanent outward or inward bend from its previous position, whereby the nose is brought outwardly or inwardly, and thus is in position to engage the cover-bead with greater or less pressure. The spring-tension necessary for permitting the cover to spring over the nose of the catch and be retained thereon may be obtained as described from the joint yielding of the cover, the vessel, and the stem of the catch, or either of these members may be made non-yielding and the necessary spring-action obtained from the other or others.

The device is shown herein applied to the main handle of a culinary vessel, but it is obvious that it may be otherwise supported on the vessel, and may be employed with vessels for other purposes.

Changes in the construction of the device may be made without departing from the spirit of the invention.

I claim:

1. The combination of a vessel whereof the body is provided with a fixed laterally extended handle and with a bead at its top, a cover provided with an inward bead of larger diameter than said bead of the body, a cover catch composed of a base attached to said handle, a stem inclined upward from said base to the bead of said body and an outward nose at the upper end of said stem adapted to engage the cover bead, and a cover removing means.

2. A vessel-cover locking-device, comprising a cover-catch supported on the vessel handle in cover-engaging position, said catch being made in two parts separated by a vertical slot, and a latch also supported on the vessel-handle and having an upwardly-inclined finger engaging the vessel-cover adjacent the catch, a latch-handle connected with said finger, and a lip on the forward end of the finger, located in said slot and guided on the catch.

3. The combination, with a vessel-body having a handle, of a resilient cover, an external bead on the vessel, an internal bead on the cover, the diameter of the cover at said bead being larger than the diameter of the vessel at its bead, and said cover-bead being located below and adapted to engage the vessel-bead when the cover is in closed position, and a catch consisting of a yielding stem supported on said vessel-body, and a nose on said stem below the plane of the vessel-bead, said nose being normally in the path of said cover, and movable inwardly therefrom into the space between the vessel and the cover-bead, and adapted to engage said cover-bead, when the cover is depressed.

4. The combination, with a vessel-body, of a resilient cover, an external bead on the vessel, an internal bead on the cover, the diameter of the cover at said bead being larger than the diameter of the vessel at its bead, and said cover-bead being located below and adapted to engage the vessel-bead when the cover is in closed position, a handle on the vessel-body, a catch supported on said handle and comprising a resilient upwardly-inclined stem and a nose on said stem below the plane of the vessel-bead and normally in the path of the cover, and movable inwardly therefrom into the space between the vessel and the cover-bead when the cover is depressed, said nose having an inclined lower face for retaining the cover in closed position by engagement with said cover-bead, and a latch pivoted to said handle and comprising an upwardly-inclined finger engaging the vessel-cover at its bead adjacent said nose, and a latch-handle connected with said lifting-finger and located removed from said vessel-handle when the lifting-finger is below said nose, and adapted when pressed toward the vessel-handle to move said lifting-finger upwardly and outwardly at its forward end until the cover-bead is disengaged from the nose.

5. The combination of a vessel whereof the body is provided with a fixed laterally extended handle having a raised abutment at its outer end, a cover provided with an inward bead, a cover catch attached to said handle and provided with a nose adapted to engage said cover, and a releasing lever having a finger adjacent to said nose and a handle adapted to engage said abutment when the cover is off, said releasing lever being engaged and set into operative position by said cover when the latter engages said nose.

In testimony, that I claim the foregoing as my invention, I have signed my name in presence of two subscribing witnesses.

MAX PEARL.

Witnesses:
 JOE HAMM,
 JOHN MURTAGH.